US011870801B2

(12) United States Patent
Kaidi

(10) Patent No.: US 11,870,801 B2
(45) Date of Patent: Jan. 9, 2024

(54) PROTECTING COMPUTER SYSTEM END-POINTS USING ACTIVATORS

(71) Applicant: PAYPAL, INC., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 313 days.

(21) Appl. No.: 17/159,836

(22) Filed: Jan. 27, 2021

(65) Prior Publication Data

US 2022/0239689 A1    Jul. 28, 2022

(51) Int. Cl.
*H04L 29/06* (2006.01)
*H04L 9/40* (2022.01)

(52) U.S. Cl.
CPC ........ *H04L 63/1441* (2013.01); *H04L 63/083* (2013.01); *H04L 63/126* (2013.01)

(58) Field of Classification Search
CPC . H04L 63/1441; H04L 63/083; H04L 63/126; H04L 9/3226
See application file for complete search history.

(56) References Cited

U.S. PATENT DOCUMENTS

| 8,140,853 | B2 * | 3/2012 | Rom | H04L 63/10 |
| | | | | 713/182 |
| 9,077,714 | B2 * | 7/2015 | Neuman | H04L 63/0892 |
| 9,152,804 | B2 * | 10/2015 | Shan | G06F 21/604 |
| 9,374,369 | B2 * | 6/2016 | Mahaffey | G06F 21/6245 |
| 9,864,852 | B2 * | 1/2018 | Johansson | H04L 63/0838 |
| 9,917,921 | B2 * | 3/2018 | Erola | H04M 3/42153 |
| 9,971,884 | B1 * | 5/2018 | Simca | G06F 21/305 |
| 10,158,620 | B2 * | 12/2018 | Smith | H04L 9/3247 |
| 2007/0250920 | A1 * | 10/2007 | Lindsay | G06F 21/31 |
| | | | | 726/7 |
| 2009/0077637 | A1 * | 3/2009 | Santos | H04L 63/126 |
| | | | | 726/5 |

(Continued)

OTHER PUBLICATIONS

Arseny Kurnikov, Andrew Paverd, Mohammad Mannan, and N. Asokan. 2018. Keys in the Clouds: Auditable Multi-device Access to Cryptographic Credentials. (SECPID'18). ACM, New York, NY, USA, 10 pages. (Year: 2018).*

*Primary Examiner* — Khalid M Almaghayreh
(74) *Attorney, Agent, or Firm* — Haynes and Boone, LLP

(57) ABSTRACT

Techniques are disclosed for mitigating network-based attacks, brute-force attacks, enumeration account takeover type attacks, and generally attacks that might result in unauthorized access to user accounts, denial-of-service, loss of functionality to users, etc. Authenticating a user at an end-point of a network may occur using an activator. In some instances, an authentication module (e.g. on a server) receives and validates a key activator. If the key activator is valid, the authentication module is activated. After the authentication module is activated, the authentication module may receive and authenticate a security credential, such as a password, that is associated with the user. If the authentication module receives the security credential without being activated, the authentication module may not authenticate the security credential, even if the security credential is a valid credential. A same user interface may be provided that receives both the key activator and the security credential, in some embodiments.

20 Claims, 10 Drawing Sheets

(56) References Cited

U.S. PATENT DOCUMENTS

| | | | | |
|---|---|---|---|---|
| 2009/0307765 | A1* | 12/2009 | Mardikar | H04L 9/3271 |
| | | | | 726/7 |
| 2010/0107229 | A1* | 4/2010 | Najafi | H04W 12/069 |
| | | | | 709/248 |
| 2011/0225638 | A1* | 9/2011 | Nahari | H04L 63/083 |
| | | | | 726/7 |
| 2013/0305392 | A1* | 11/2013 | Bar-El | H04L 63/0823 |
| | | | | 726/29 |
| 2014/0115721 | A1* | 4/2014 | Shan | H04L 65/613 |
| | | | | 726/27 |
| 2015/0128241 | A1* | 5/2015 | Jakobsson | G06F 21/33 |
| | | | | 726/7 |
| 2015/0186628 | A1* | 7/2015 | Bush | G06F 21/32 |
| | | | | 726/19 |
| 2015/0318998 | A1* | 11/2015 | Erlikhman | H04L 63/0853 |
| | | | | 713/171 |
| 2016/0344730 | A1* | 11/2016 | Holz | H04L 63/0876 |
| 2018/0089693 | A1* | 3/2018 | Martin | H04M 7/0024 |
| 2018/0109554 | A1* | 4/2018 | Reddy | H04L 63/10 |
| 2018/0152598 | A1* | 5/2018 | Tsuji | H04N 1/00074 |
| 2019/0222424 | A1* | 7/2019 | Lindemann | H04L 9/3231 |
| 2020/0059466 | A1* | 2/2020 | Jiang | H04L 63/1483 |
| 2020/0273040 | A1* | 8/2020 | Novick | H04W 12/122 |
| 2021/0092552 | A1* | 3/2021 | Edge | H04W 4/02 |
| 2022/0021706 | A1* | 1/2022 | Jubilee | H04L 63/20 |

* cited by examiner

PROTECTING COMPUTER SYSTEM END-POINTS USING ACTIVATORS

TECHNICAL FIELD

This disclosure generally relates to computer authentication systems, and more specifically to an authentication mechanism design that protects computer end-points from targeted network-based attacks, according to various embodiments.

BACKGROUND

End-points of a network, such as the Internet, are exposed to both legitimate and malicious users. The malicious users may steal security credentials of a legitimate user and then attempt to access the legitimate user's account by applying a targeted network-based attack. In a brute-force approach, for example, malicious users may continue to attempt to log into the legitimate user's account with the legitimate user's stolen credentials or their variants and different malicious user generated passwords until one of the credential-password combinations matches the user's credentials. The number of attempts may be thousands or even more, as these are typically computer-generated attempts, and the brute-force approach can sometimes allow for unauthorized access.

Another issue with network-based attacks is that in some cases they can affect a denial-of-service (DoS) on a target. For example, an account may be locked (temporarily disabled) if too many incorrect user passwords are submitted. On a wider scale, brute-force submission of incorrect passwords to many different user accounts could cause disruption to an internal or external user base of a system or service if those accounts were locked out. Applicant recognizes there is a need to prevent certain types of network attack attempts, but without negatively impacting legitimate users who might be affected by those attack attempts.

Figure 1:
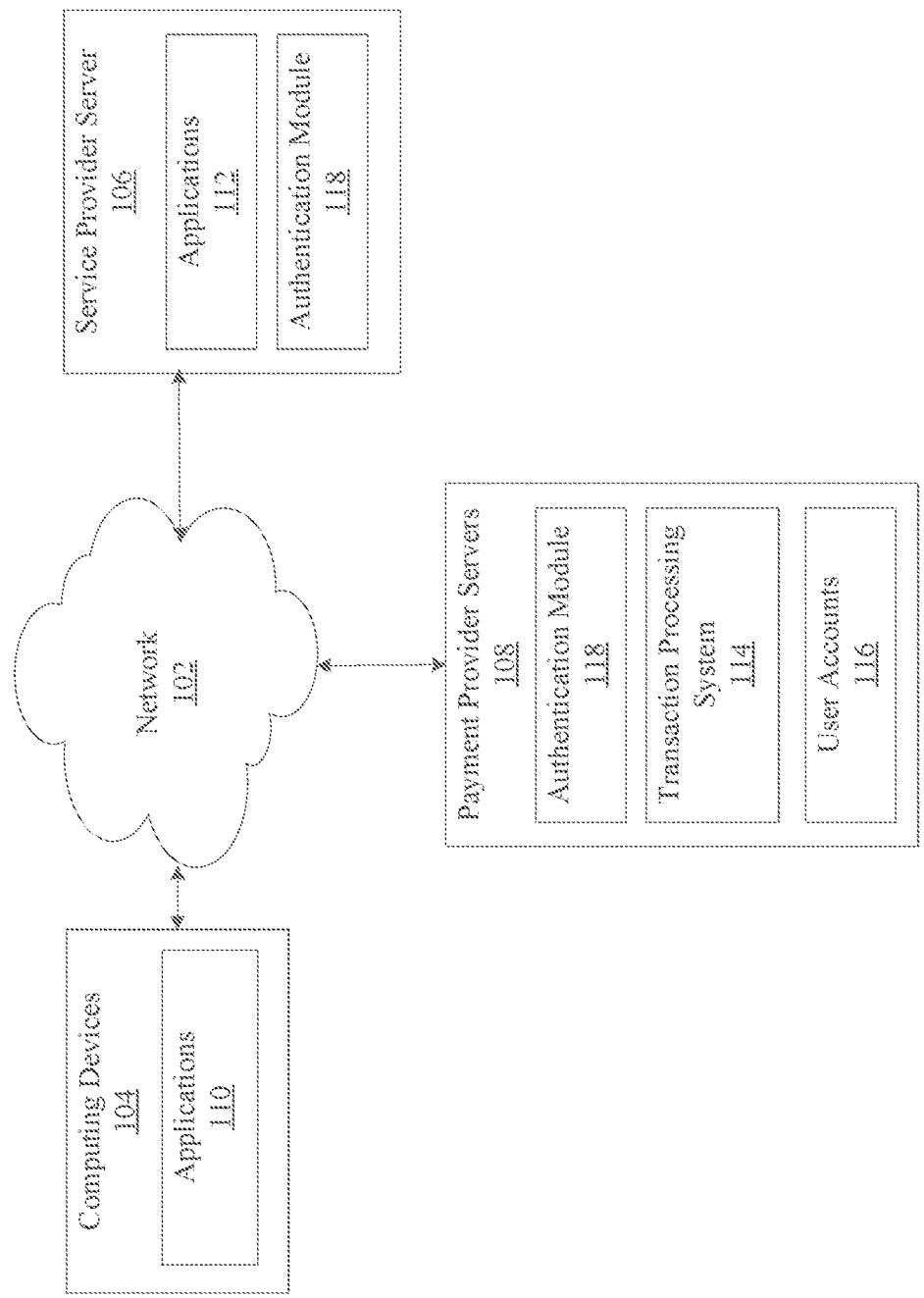
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various embodiments are directed to an authentication technique that uses an authentication module and reduces the impact of network attacks at end-points of a computer network. One example of such network attack is a brute-force attack. The authentication module activates after receiving a key activator. The key activator may be associated with a user, and may include a single key activator or a sequence of key activators. After the authentication module is activated, the authentication module may receive and authenticate a security credential, such as a password, that is associated with the user. If the authentication module receives the security credential without first being activated, the authentication module may not authenticate the security credential, even if the security credential is a valid credential. In some instances, the authentication module may activate for a predefined active time period. In this case, the authentication module may authenticate the security credential if the authentication module receives the security credential during the predefined active time period.

Broadly, the authentication techniques described herein prevent network-based attacks by requiring use of a key activator before a secondary authentication step, such as authenticating credentials, is performed, in various embodiments. If the key activator is not properly used, an attacker (trying a brute force and/or other type of network attack) will be denied access to the computing resource. Further, if the key activator is not properly used, a security mitigation technique (such as e.g. account lockout) may never be triggered. This has a double benefit: attacks are harder to execute, and users are not subjected to security mitigation which might result in loss and/or denial of functionality for one or more users of a service.

In some embodiments, the authentication module may be used to authenticate a user trying to access a service, application, and/or other computing resource at an end-point. The end-point may provide access to an application via a user interface that displays log-in input fields that may receive user credentials, such as a username input field and a password input field. First, the user interface may receive a username in the username input field and a key activator in a password input field from the user. The username and the key activator may be transmitted to the authentication module that may be activated using the key activator. In response, the authentication module may transmit an authentication failure message, even if activated. The authentication failure message may display a log-in error so that the malicious user remains oblivious to the authentication module that uses key activators and instead may believe that an incorrect username and password combination was entered. The authentication failure message may prompt the legitimate user to enter the username in the username input field and a security credential, e.g., password, in the password input field. The username and password, once transmitted, may cause the authentication module to authenticate the password.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under the control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) applications, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 7.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at the requests of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions, applications 110, 112 may request payments for processing the transactions via payment provider server(s) 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106.

Payment provider server 108 may also include user accounts 116. Each user account 116 may be established by one or more users using applications 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or another memory storage described in detail in FIG. 7.

In system 100 above, service provider server 106, applications 112, payment provider servers 108, and transaction processing system 114 may be accessed using end-points. An end-point may be a location in system 100, such as a user interface of application 110, that may be used to obtain access to other applications 112 and servers 106, 108. Conventionally, the end-points may receive user credentials, such as a username and password, at for example, application 110. The user credentials may be authenticated by the corresponding service provider server 106, applications 112, payment provider servers 108, and transaction processing system 114, etc. However, as discussed above, the end-points are susceptible to network attacks by malicious users. Network attacks occur when a malicious user attempts multiple username and password combinations, until one of the combinations matches the legitimate user's credentials. The network attacks may be further facilitated when the malicious user is able to obtain one or more the user's credentials, such as the legitimate user's username or a list of previously used passwords, and then attempts various variants of the username, previously used passwords or both to obtain access at an end-point.

To provide additional security at the end-points, system 100 includes an authentication module 118 in the embodiment shown. Authentication module 118, like other modules discussed herein, may be implemented as stored executable computer code. Unlike a simple authentication module that merely authenticates user credentials, such as username and password, authentication module 118 may implement a multi-step mechanism to authenticate a user. In this example, authentication module 118 first receives a key activator that activates the authentication module 118. After the authentication module 118 activates, authentication module 118 may authenticate the user using a username and password. If the authentication module 118 is not activated, the authentication module 118 may not authenticate the user using the username and password, even if the username and password are valid credentials. Authentication module 118 may be implemented on the same device as servers 106 or 108 or may be implemented within applications or systems executing on servers 106, 108, such as applications 112 or transaction processing system 114 (not shown).

Figure 2A:
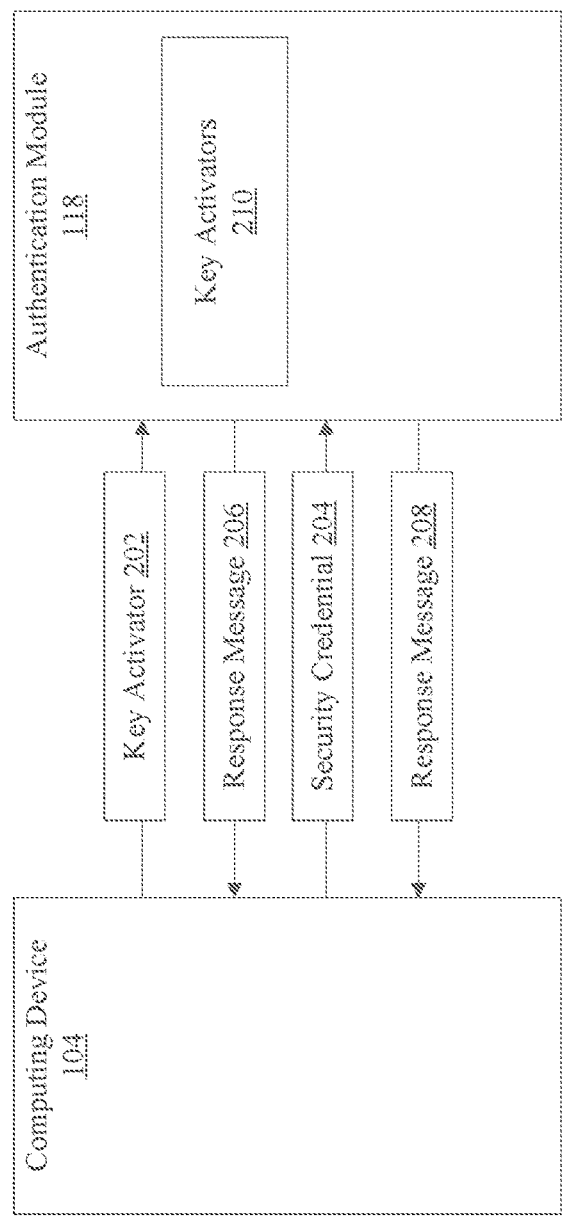
FIGS. 2A-C are block diagrams of an authentication module attempting to authenticate a user, according to an embodiment.

FIG. 2A is a block diagram 200A of an authentication module, according to an embodiment. Authentication module 118 shown in FIG. 2A implements a two-step process for authenticating a legitimate user. In the first step, authentication module 118 may receive a key activator 202 from computing device 104.

Key activator 202 may be a character string, an alphanumeric string, a special character string, or a combination thereof in some embodiments. A key activator could also be another type of input, such as a graphical image selection, a video or audio selection, etc. A username may also accompany key activator 202. Key activator 202 may activate authentication module 118 to authenticate a subsequently received security credential 204, such as a password. If authentication module 118 is not activated, authentication module 118 may not authenticate a legitimate user even when the security credential 204 is correct.

Once authentication module 118 receives key activator 202, authentication module 118 may determine whether the key activator 202 is valid. For example, authentication module 118 may compare the key activator 202 against valid key activators 210 that are securely stored within the application module 118. Key activators 210 may be specific to users that attempt to access applications 110 using the end-points discussed in FIG. 1. In this case, authentication module 118 may also use the username that accompanies key activator 202 to identify a user and a corresponding key activator from key activators 210. If key activator 202 matches one of the valid key activators 210, authentication module 118 is activated and enters into an active mode. In some embodiments, instead of validating key activator 202, authentication module 118 may generate a hash of key activator 202 and validate the hash against the hashes of key activators 210.

Authentication module 118, when activated, may authenticate security credential 204 transmitted from computing device 104. Security credential 204 may be a user password. In some instances, security credential 204 may be the same data type, e.g. a character string, an alphanumeric string, etc., as key activator 210. In this way, the same input field may be used to receive both the key activator 202 and security credential 204, as will be further discussed below. In some instances, authentication module 118 may track the Internet protocol address, the browser identifier, device identifier, etc., of computing device 104 to ensure that the same computing device 104 transmitted both the key activator 202 and security credential 204.

In an embodiment, when key activator 202 activates authentication module 118, authentication module 118 initiates an active time interval or a time window. The active time interval may be a time period during which authentication module 118 may receive and authenticate security credential 204. The active time interval may be predefined and configurable. After the time interval expires, authentication module 118 deactivates. In other words, if authentication module 118 receives security credential 204 outside of the active time interval, authentication module 118 may not authenticate security credential 204 even if security credential 204 is a valid security credential.

In an embodiment, authentication module 118 may shorten the active time interval. For example, authentication module 118 may shorten the active time interval in response to receiving more than a predefined number of incorrect security credentials 204 during a predefined activate time period. In another example, authentication module 118 may deactivate in response to receiving more than a predefined number of incorrect security credentials 204 during a predefined activate time period.

In an embodiment, key activators 202 may be dynamic. That is, the value of key activator 202 may change with each use or after a predetermined time period. The new value may be provided to computing device 104 prior to the subsequent use. In this way, even if a malicious user obtains key activator 202, the key activator 202 may likely be or become obsolete by the time the malicious user attempts to use the key activator 202.

In an embodiment, authentication module 118 may transmit a response message 206 to computing device 104. For example, once authentication module 118 activates, authentication module 118 may transmit response message 206 to computing device 104. Response message 206 may be formatted such that a malicious user may not know that authentication module 118 uses a two-step authentication mechanism to authenticate the user. For example, even though key activator 202 activates authentication module 118, response message 206 may include a failed login status or a log-in error message, when in fact, authentication module 118 is active and is waiting to receive security credential 204.

In another example, authentication module 118 may generate a response message 208 message. Response message 208 indicates whether or not authentication module 118 authenticated security credential 204. If authentication module 118 failed to authenticate security credential 204, response message 208 may also include a log-in error message. Alternatively, if authentication module 118 authenticates security credential 204 during the active period, response message 208 may indicate that the authentication was validated or may redirect a user to a user interface, such as a home page or a home screen that is associated with application 110.

Figure 2B:
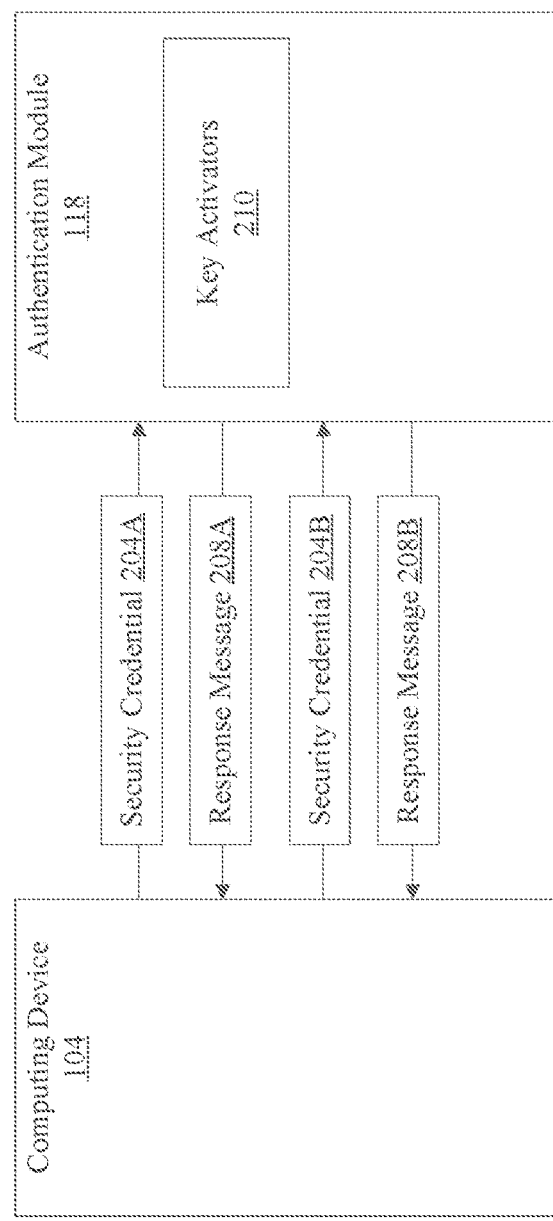

When authentication module 118 authenticates the user, a network attack, such as a brute-force attack, may be useless. This is because a malicious user, even knowing or guessing security credential 204 may still not be able to activate authentication module 118 without a key activator 202 which renders knowing or guessing the security credential 204 useless. This is because authentication module 118 may not authenticate security credential 204 when it is inactive even when security credential 204 is valid. FIG. 2B is a block diagram 200B of an authentication module, according to an embodiment. FIG. 2B illustrates authentication module 118 failing to authenticate computing device 104 with a valid security credential 204. In FIG. 2B, a malicious user operating computing device 104 attempts a network attack to authenticate with authentication module 118 by transmitting security credentials 204A and 204B. For example purposes only, suppose a username is known, security credential 204A includes an incorrect password and security credential 204B includes a correct password for a legitimate user.

When authentication module 118 receives security credential 204A, authentication module 118 may generate a response message 208A that indicates that the authentication failed in response to receiving security credential 204A. Notably, response message 208A may include information that does not allow the malicious user to differentiate whether the security credential 204A has failed or whether authentication module 118 was not activated. In other words, in this case, response message 208A may be the same as response message 206 discussed in FIG. 2A.

When authentication module 118 receives security credential 204B that includes a correct password, authentication module 118 may also generate response message 208B that indicates an authentication failure in response to receiving security credential 204B. This is because authentication module 118 has not been activated using key activator 202 discussed in FIG. 2A and remains inactive. Accordingly, even though the malicious user transmitted security credential 204B that is a valid credential, authentication module 118 still fails to authenticate security credential 204B because authentication module 118 has not received key activator 202.

Figure 2C:
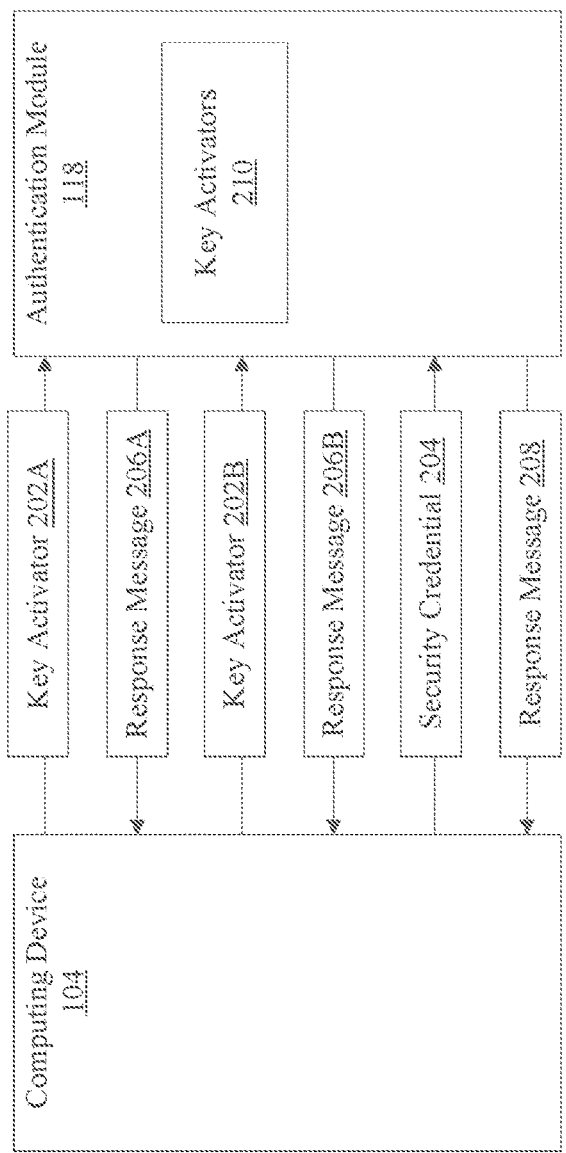

In some embodiments, key activator 202 may include multiple key activators. FIG. 2C is a block diagram 200C of an authentication module, according to an embodiment. In FIG. 2C, authentication module 118 may be configured to receive multiple key activators 202, such as key activators 202A and 202B. For example, authentication module 118 may be configured with a sequence of key activators 202 and may receive the key activators 202 in sequence before being activated to authenticate security credential 204. In some instances, to be activated, authentication module 118 may be configured to receive the sequence of key activators 202 within a predefined time interval, e.g. two minutes.

For illustration purposes only, authentication module 118 may be configured to receive a sequence of key activators 202, where key activator 202A is followed by key activator 202B for a particular user. In this case, key activators 210 may store a sequence of key activators 202A, 202B and both key activators 202A, 202B may be received before authentication module 118 activates. For example, when authentication module 118 receives key activator 202A and determines that key activator 202A is valid, authentication module 118 may mark key activator 202A as received and may wait to receive key activator 202B. In some embodiments, in response to receiving key activator 202A, authentication module 118 may transmit response message 206A that indicates to computing device 104 that authentication failed. Next, authentication module 118 may receive key activator 202B. If the key activator 202B is valid, authentication module 118 may mark that sequence that includes key activators 202A, 202B has been received and may activate. If authentication module 118 receives key activator 202B that is not valid, authentication module 118 may be configured to again receive the sequence that includes key activators 202A, 202B prior to activating. In some embodiments, authentication module 118 may also transmit response message 206B that indicates to computing device 104 that authentication failed, when in fact authentication module 118 is now active and is waiting to receive security credential 204. As discussed above, response messages 206A and 206B may indicate to the malicious user that authentication has failed and without indicating that authentication module 118 implements a two-step process for authenticating security credential 204.

Once authentication module 118 is activated, authentication module 118 may wait to receive security credential 204. As discussed above, authentication module 118 may be active for a predefined active time interval during which authentication module 118 waits to receive security credential 204. Once the predefined active time interval has elapsed, the authentication module 118 may no longer be able to authenticate security credential 204 without receiving another sequence of key activators 202, such as key activator 202A followed by key activator 202B. For illustrative purposes only, suppose authentication module 118 receives security credential 204 during the predefined active time interval. Authentication module 118 authenticates security credential 204 if security credential 204 is a valid credential and transmits response message 208. Response message 208 indicates that the authentication is successful. If security credential 204 is not a valid credential, authentication module 118 transmits response message 208 indicating that the authentication failed.

Figure 3:
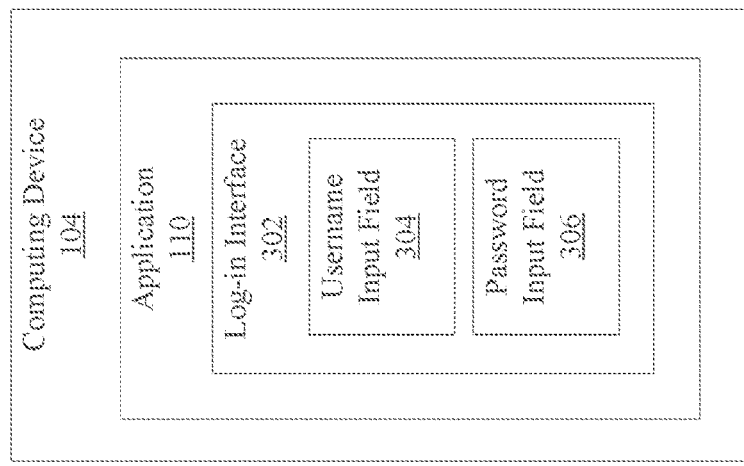
FIG. 3 is a diagram of a user interface for receiving a key activator and a security credential, according to an embodiment.

As discussed above, computing device 104 may use a user interface at an end-point to provide key activator 202 and security credential 204. FIG. 3 is a diagram 300 of a user interface for providing key activators and credential, according to an embodiment. In some instances, application 110 that executes on computing device 104 may include a log-in interface 302 that a user may conventionally use to input a username and a security credential 204, such as a password. Application 110 may display the log-in interface 302 on computing device 104. The log-in interface 302 may include input fields that receive user data, such as a username input field 304 and a password input field 306.

Notably, the display of the log-in interface 302 may remain the same regardless whether a conventional authentication mechanism or authentication module 118 is used to authenticate the user. The same log-in interface 302 that is displayed for a fraudulent or genuine user means that the fraudulent user may not even realize that authentication module 118 that involves a two-step authentication process is being used. This means that the chance of a fraudulent user of being authenticated is effectively zero because there is an almost zero change of the fraudulent user guessing the sequence that involves key activator 202 and security credential when the fraudulent user may not even know that a two-step authentication process is being used.

In one embodiment, in the first step of the two-step authentication process, username input field 304 may receive a username, and password input field 306 may receive key activator 202. Application 110 may then transmit the username provided to username input field 304 and key activator 202 provided to password input field 306 to authentication module 118.

As discussed above, authentication module 118 may be activated using multiple key activators 202. In this case, username input field 304 may receive username, while password input field 306 may receive key activator 202A and key activator 202B. In some instances, password input field 306 may receive both key activator 202A first and key activator 202B after computing device 104 transmits key activator 202A to authentication module 118. In other instances, password input field 306 may receive key activators 202A and 202B together where key activators 202A and 202B are separated by a space or another separator. In another example, username input field 304 may receive key activator 202A and password input field 306 may receive key activator 202B. In this case, the username may have been previously transmitted to authentication module 118.

Regardless of whether authentication module 118 is activated using key activators 202, authentication module 118 may still transmit the same authentication failed message in response message 206 discussed in FIG. 2A-C. Once computing device 104 receives the response message 206, the authentication failure message may be displayed using log-in interface 302. The authentication failure message, once displayed, may not indicate to the fraudulent user that a two-step authentication process is being used. Instead, the authentication failure message may indicate to the fraudulent user to simply proceed and try another password. On the other hand, authentication failure message may indicate to the genuine user that the authentication module 118 has been activated and log-in interface 302 may now receive security credential as discussed in the second step of the authentication process.

During the second step of the two-step authentication process, username input field 304 may receive a username and password input field 306 may receive security credential 204, e.g. password. Computing device 104 may then transmit the username and security credential 204 to authentication module 118 as discussed in FIGS. 2A-2C.

As illustrated above, password input field 306 may receive key activator 202 and security credential 204. Because password input field 306 may be configured to receive certain data types or have certain allowed or prohibited characters, key activator 202 and security credential 204 may be a sequence of characters that have the same data type or the same allowed characters, and may also be entered using the same input field.

Figure 4A:
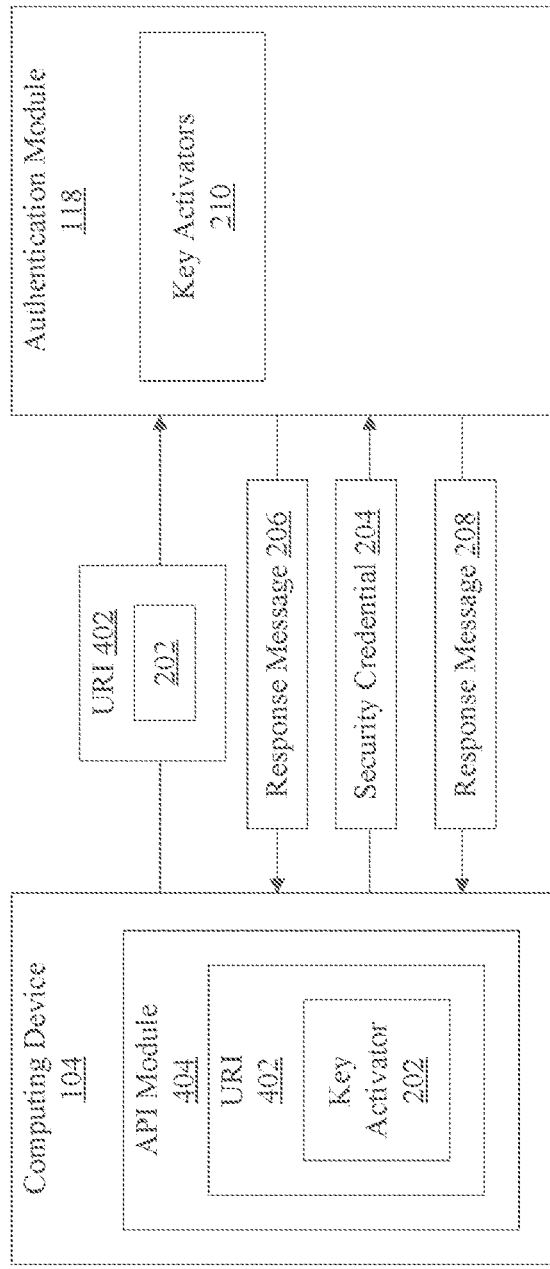
FIG. 4A is a block diagram of an interface for providing a unified resource identifier (URI) that includes a key activator, according to an embodiment.

In some embodiments, key activators 202 may also be transmitted as part of a unified resource identifier (URI). FIG. 4A is a block diagram 400A of an interface for providing unified resource identifier that includes a key activator, according to an embodiment. As illustrated in FIG. 4A, computing device 104 may receive an input that causes application programming interface (API) module 404 to generate a URI 402 that includes key activator 202. Example input may be instructions to access a payment website, which may cause API module 404 to generate URI 402 that is "/v1/payments/capture/Seq1-h38u/" where "Seq1-h38u" may be key activator 202. The input may be provided using application 110 (not shown) or in response to a user using computing device 104. Computing device 104 may transmit URI 402 to authentication module 118. Authentication module 118 may extract key activator 202 from the URI 402 and validate key activator 202 as discussed in FIG. 2A. If key activator 202 is validated, authentication module 118 activates as discussed above.

In some embodiments, API module 404 may generate URI 402 that includes multiple key activators 202, such as key activators 202A and 202B. In this case, authentication module 118 extracts multiple key activators 202 from URI 402 and validates the multiple key activators 202 as discussed in FIG. 2C.

Figure 4B:
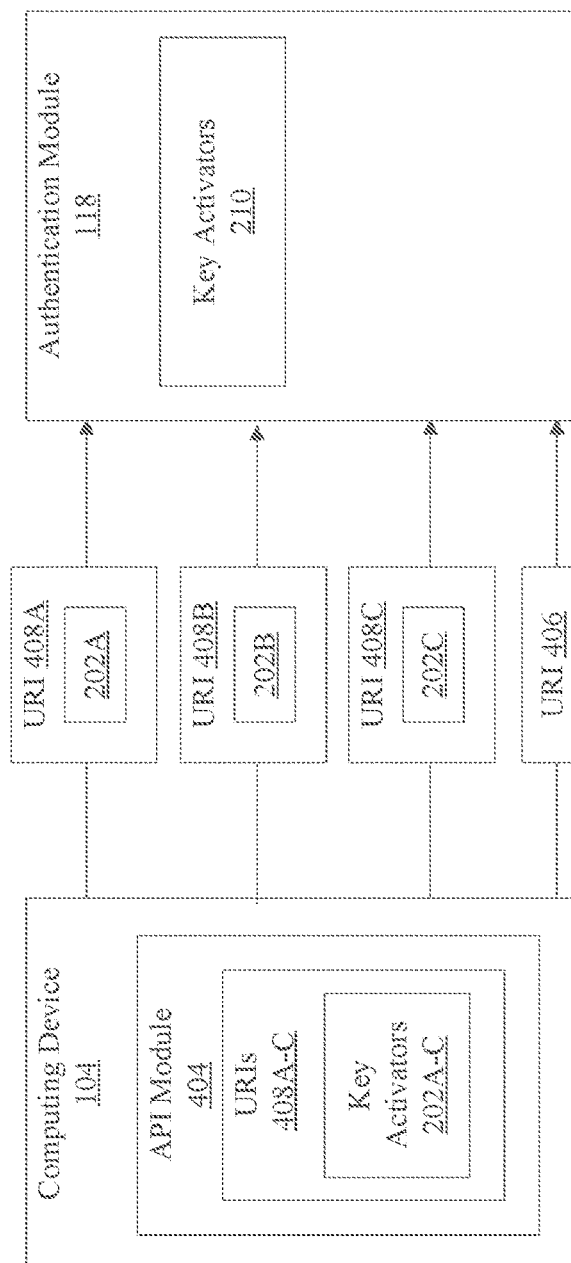
FIG. 4B is a block diagram of an application programming interface for providing multiple unified resource identifiers (URIs), according to an embodiment.

In some embodiments, API module 404 may generate multiple URIs 402 that include key activators 202. FIG. 4B is a block diagram 400B of an interface for providing multiple unified resource identifiers that include key activators, according to an embodiment. Computing device 104 may generate multiple URIs 408, each having a different key activator 202 to activate authentication module 118. The activated authentication module 118 may then process a URI 406 that does not include key activator 202 so that computing device 104 may access an application protected by authentication module 118, such as application 112 or servers 106, 108.

For example, computing device 104 of a merchant may cause API module 404 to generate a call to process a refund through application 112 and/or transaction processing system 114. An example URI to process the refund may be "/v1/payments/capture/{random}/refund." However, directly invoking this URI may be futile because authentication module 118 is not activated. To activate authentication module 118, API module 404 may generate a sequence of URIs 408A-C, where each URI 408 includes key activator 202A-C. For example, URI 408A may be "/v1/payments/capture/Seq1-h38u/" and include key activator 202A that is "Seq1-h38u," URI 408B may be "/v1/payments/capture/Seq2-ofkj3/" and include key activator 202B that is "Seq2-ofkj3," and URI 408C may be "/v1/payments/capture/Seq3-p1028/" and include key activator 202C that is "Seq2-ofkj3." API module 404 may generate a sequence of URIs 408A-C from a script stored in a memory of computing device 104.

Computing device 104 may transmit URIs 408A-C to authentication module 118. Once authentication module 118 receives URI 408A-C, and extracts and validates key activators 202A-C in the respective URIs 408A-C, authentication module 118 may activate. The activated authentication module 118 may receive URI 406 and grant computing device 104 access to URI 406 to process a refund.

In an embodiment, authentication module 118 may be further configured to receive URIs 408A-C in a predefined sequence and/or during a predefined active time interval, e.g. 2 minutes.

Figure 5:
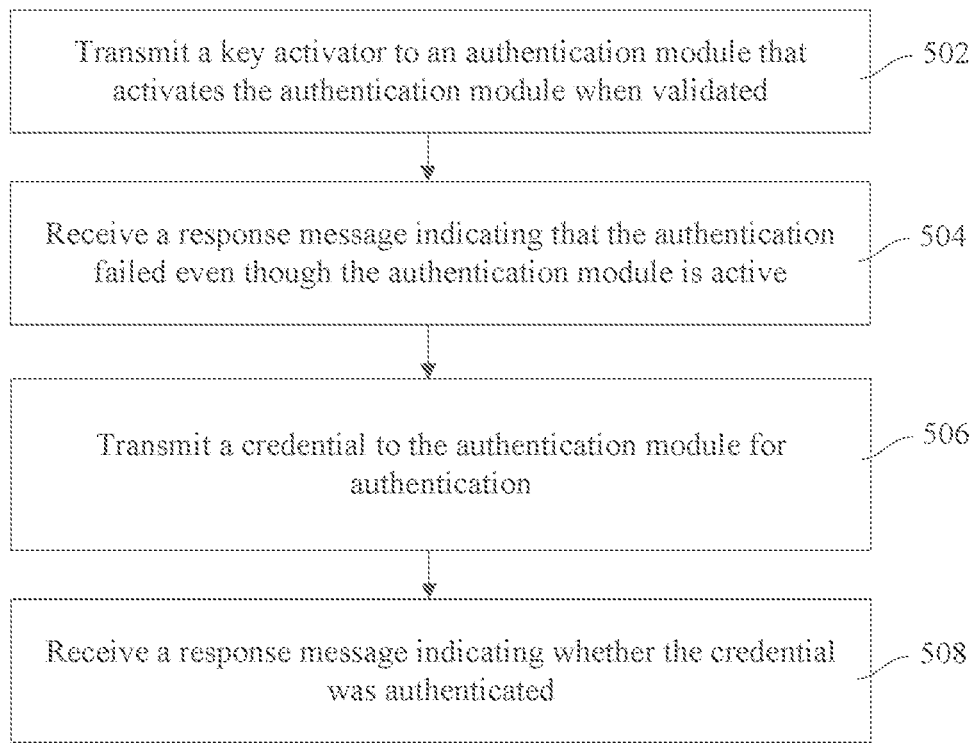
FIG. 5 is a flowchart of a method for authenticating a user, according to an embodiment.

FIG. 5 is a flowchart of a method 500 for authenticating a user according to an embodiment. Method 500 may be performed using hardware and/or software components described in FIGS. 1-4AB. More particularly, operations of method 500 may be performed by computing device 104 in some embodiments. Note that one or more of the operations may be deleted, combined, or performed in a different order as appropriate.

At operation 502, a key activator is transmitted. For example, computing device 104 may receive key activator 202 using an input field in a user interface, such as password input field 306 that includes key activator 202, and transmit key activator 202 to authentication module 118. If key activator 202 is validated against key activators 210, authentication module 118 may be activated to authenticate security credential 204. As discussed above, key activator 202 may be a single key activator 202 or a sequence of key activators 202A, 202B. As also discussed above, authentication module 118 may be activated for a predefined active time interval. If key activator 202 is not validated, method 500 ends.

At operation 504, a response message is received. For example, computing device 104 may receive response message 206 from authentication module 118. Response message 206 may include an error message that indicates that authentication has failed when in fact authentication module 118 may have been activated. The content of the response message 206 may be displayed on a user interface of computing device 104 to indicate to a malicious user conducting a network attack that the log-in was unsuccessful, and to indicate to the legitimate user to proceed and enter security credential 204. In some embodiments, operation 504 may be optional.

At operation 506, a security credential is transmitted for validation. For example, computing device 104 may receive security credential 204 using password input field 306 displayed in the user interface. This may be the same input field used to receive key activator 202 in operation 502. Computing device 104 may transmit security credential 204 to authentication module 118 for authentication. If authentication module 118 is active, authentication module 118 may authenticate security credential 204. Authentication module 118 is active when, for example, key activator 202 has been validated in operation 502 and/or the predefined active time interval during which authentication module 118 is active has not expired. On the other hand, if authentication module 118 has not been activated in operation 502, authentication module 118 may not authenticate security credential 204 even if security credential 204 is a valid credential. Authentication module 118 may also not authenticate security credential 204 if the active time period has expired, and/or the security credential is an invalid credential.

At operation 508, a response message is received. For example, computing device 104 may receive response message 208 message from authentication module 118. Response message 208 may indicate to computing device 104 whether security credential 204 has or has not been authenticated. In some instances, if security credential 204 has not been authenticated, the content of response message 208 may include an error message that has the same content as response message 206.

Figure 6:
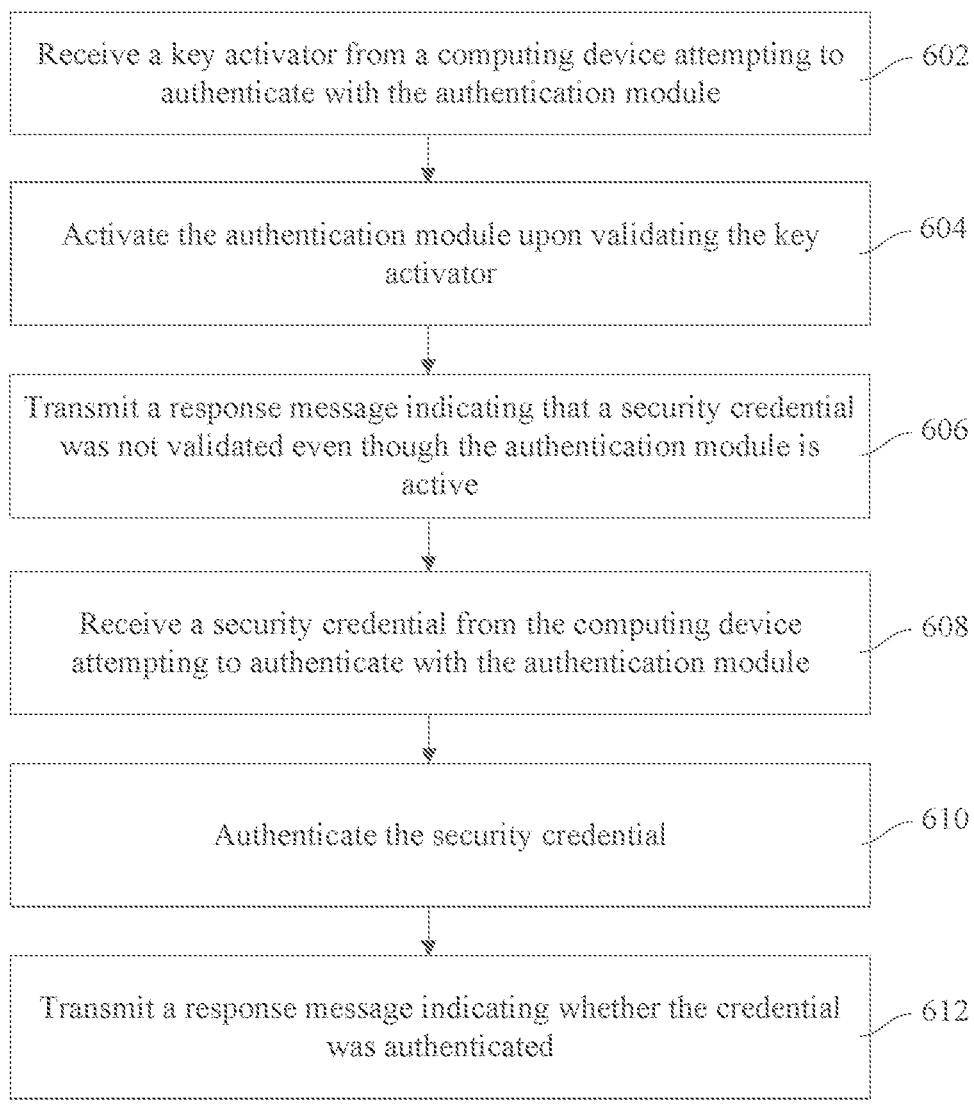
FIG. 6 is a flowchart of a method for authenticating a user, according to an embodiment.

FIG. 6 is a flowchart of a method 600 for authenticating a user, according to an embodiment. Method 600 may be performed using hardware and/or software components described in FIGS. 1-4AB. More particularly, in some embodiments method 600 may be performed by service provider server 106. Note that one or more of the operations may be deleted, combined, or performed in a different order as appropriate.

At operation 602, a key activator is received. For example, authentication module 118 receives key activator 202 from computing device 104. As discussed above, key activator 202 may be a sequence of multiple key activators, such as key activators 202A, 202B.

At operation 604, the authentication module is activated. For example, authentication module 118 may validate key activator 202 or a hash of key activator 202 against key activators 210 or hashes of key activators 210 that are securely stored within authentication module 118. In some instances, key activator 202 may be user specific, in which case key activators 210 may be associated with a username or user profile which authentication module 118 may also receive with key activator 202. Once key activator 202 is validated, authentication module 118 may enter into an activate state during which authentication module 118 may authenticate security credentials 204. As discussed above, authentication module 118 may be activated for a predefined active time interval. If key activator 202 is not validated, method 600 proceeds to operation 606 and then ends.

At operation 606, a response message is transmitted. For example, authentication module 118 may transmit response message 206 to computing device 104. Response message 206 may indicate that authentication has failed to authenticate security credential 204, when in fact authentication module 118 may have been activated upon validating key activator 202. If authentication module 118 has not been activated, authentication module 118 may still generate response message 206. Response message 206 may indicate to a malicious user conducting a network attack that the log-in was unsuccessful, rather that authentication module 118 has been activated or that authentication module 118 that uses key activator 202 is being used. In some embodiments, operation 606 may be optional.

At operation 608, a security credential is received. For example, authentication module 118 may receive security credential 204 from computing device 104.

At operation 610, the security credential is authenticated. For example, if authentication module 118 is active and security credential 204 is valid, authentication module 118 may authenticate security credential 204. In some instances, to authenticate security credential 204, operation 608 may occur during the predefined active time interval. If authentication module 118 is not active, security credential 204 is not valid, or security credential 204 is received outside of the predefined active time interval, authentication module 118 may not authenticate security credential 204.

At operation 612, a response message is transmitted. For example, authentication module 118 may generate and transmit response message 208 to computing device 104. Response message 208 may indicate whether security credential 204 was or was not successfully authenticated. For example, response message 208 may indicate that security credential 204 was successfully authenticated because authentication module 118 was active, security credential 204 is a valid credential, and security credential 204 was received during predefined active time period. Alternatively, response message 208 may include a log-in error message because security credential 204 was not successfully authenticated. As discussed above, this may occur when authentication module 118 is not active, security credential 204 is not a valid credential, or security credential 204 was not received during a predefined active time period.

The embodiments described herein, are directed to resisting and reducing effectiveness of brute-force attacks. As discussed above, usernames, e.g. email addresses, users last names, or combinations of users first and last names are often public or discoverable. With the embodiments above, even if the user's username or password are exposed or discovered, a malicious user may still not be able to obtain access to user information, e.g. account information, unless the malicious user has access to both a key activator and a security credential, e.g., user password.

The embodiments described herein may also be resistant to password dumps, credential stuffing, and password spraying. This occurs when usernames are exposed and leaked to a malicious user. The malicious user then uses a network attack and attempts to access to legitimate users' information by trying common passwords. However, because the malicious user may not have access to a key activator, the malicious user may not obtain access to user accounts even if the malicious user identifies a correct password.

The embodiments herein may also be resistant to passwords reused by legitimate users. It is a common practice among users to reuse the same password, or the same password string pattern among multiple accounts. A malicious user may host a website and trick legitimate users into signing up and entering their passwords. The malicious user may then use the entered passwords in a network attack against user accounts that a legitimate user has with different providers. However, as discussed above, even if the malicious user obtains the user password, the malicious user may not be able to obtain access through the authentication module because the malicious user does not have the key activator that activates the authentication module.

Using the embodiments discussed herein may also increase a number of attempts a user can make before an authentication module causes an account to be locked. Conventionally, a provider may limit a user to making a predefined number, e.g. five failed login attempts within an hour from a particular IP address, before blocking further attempts from that IP address. Alternatively, a provider may also limit a user to making a predefined number, e.g. 20 failed login attempts within an hour from any IP address. However, because of the two-step authentication process described herein, the number of failed attempts that a user may make to access user information may increase to e.g. 500 attempts. This is because the two-step authentication process is less susceptible to network attacks.

Using the embodiments discussed herein may also prevent malicious password resets by unauthorized parties. This is because, the authentication module may use a key activator to activate prior to processing a request to reset a password.

In some embodiments, the two-step authentication process may be an opt-in feature that may be selected by user who wants to increase security for their user information in a system. Alternatively, the two-step authentication process may be mandatory for high-risk users whose user information is targeted by fraudulent users.

In some embodiments, the two-step authentication process exponentially limits exposure of information at endpoints. This is because the fraudulent user may be required to correctly determine both a key activator and a security credential to access user information. When the authentication module uses multiple key activators, the two-step authentication process is even more effective because fraudulent users may be required to correctly determine multiple key activators, in sequence, as well as the security credential to access user information. The two-step authentication process further limits exposure by using an active time interval during which the authentication module may authenticate the security credential during the second step of the process and decrease or eliminate the active time interval when the authentication module receives multiple incorrect security credentials.

Figure 7:
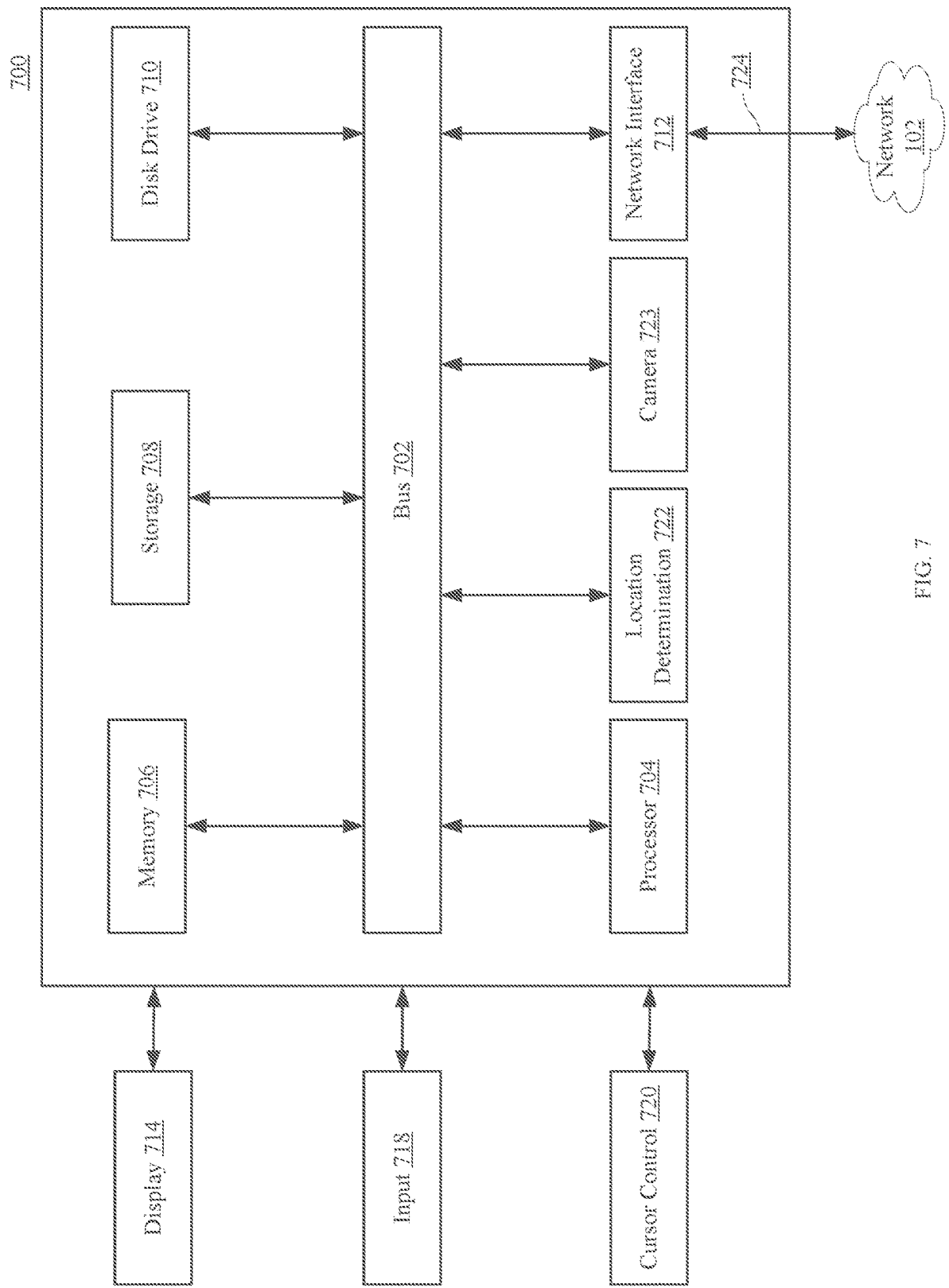
FIG. 7 is a block diagram of a computer system suitable for implementing one or more components or operations in FIGS. 1-6 according to an embodiment.

Referring now to FIG. 7 an embodiment of a computer system 700 suitable for implementing, the systems and methods described in FIGS. 1-6 is illustrated.

In accordance with various embodiments of the disclosure, computer system 700, such as a computer and/or a server, includes a bus 702 or other communication mechanism for communicating information, which interconnects subsystems and components, such as a processing component 704 (e.g., processor, micro-controller, digital signal processor (DSP), graphics processing unit (GPU), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the disclosure, the computer system 700 performs specific operations by the processor 704 executing one or more sequences of instructions contained in the memory component 706, such as described herein with respect to the mobile communications devices, mobile devices, and/or servers. Such instructions may be read into the system memory component 706 from another computer readable medium, such as the static storage component 708 or the disk drive component 710. In other embodiments, hard-wired circuitry may be used in place of or in combination with software instructions to implement the disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 700. In various other embodiments of the disclosure, a plurality of the computer systems 700 coupled by a communication link 724 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
   receiving key activators at an authentication module of a computing device, wherein the key activators include a first key activator and a second key activator incorporated into a sequence of Unified Resource Identifiers (URIs), wherein a first Unified Resource Identifier (URI) in the sequence of URIs includes the first key activator and a second URI in the sequence of URIs includes the second key activator;
   extracting the first key activator from the first URI and the second key activator from the second URI;
   validating, at the authentication module, the key activators, wherein the validated key activators are configured to activate the authentication module for authenticating a security credential during a predefined time interval;
   subsequent to validating the key activators, receiving the security credential at the authentication module;
   authenticating the security credential using the authentication module; and
   transmitting an indicator indicating whether the authentication module authenticated the security credential.

2. The method of claim 1, further comprising:
   transmitting a login error in response to receiving the key activators regardless of whether or not the key activators are validated.

3. The method of claim 1, wherein at least one key activator in the key activators and the security credential have the same data type.

4. The method of claim 1, wherein at least one key activator in the key activators and the security credential are in a character sequence format received from a user interface of an application executing on another computing device.

5. The method of claim 1,
   wherein the security credential is received during the predefined time interval, wherein the security credential is a valid security credential; and
   wherein the indicator indicates that the security credential was authenticated.

6. The method of claim 1,
   wherein the security credential is received outside of the predefined time interval, wherein the security credential is a valid security credential; and
   wherein the indicator indicates that the security credential was not authenticated.

7. The method of claim 1, further comprising:
   receiving a plurality of security credentials including the security credential during the predefined time interval, wherein a number of the plurality of security credentials is more than a predefined number of security credentials that the authentication module is configured to receive during the predefined time interval; and
   reducing, using the authentication module, the predefined time interval in response to receiving more than the predefined number of security credentials.

8. A method, comprising:
   transmitting to an authentication module, from a client device, key activators as a sequence of URIs (Unified Resource Identifiers), wherein a first key activator is incorporated in a first Unified Resource Identifier (URI) in the sequence of URIs and a second key activator is incorporated into a second URI in the sequence of URIs, wherein the first key activator and the second key activator in the key activators are configured to activate the authentication module for authenticating a security credential during a predefined time interval;
   after transmitting the key activators, transmitting, the security credential to the authentication module for authentication; and
   receiving an indicator indicating whether the security credential was authenticated.

9. The method of claim 8, further comprising:
   receiving the key activators and the security credential at the same user input location of a user interface displayed on the client device.

10. The method of claim 8, further comprising:
receiving at least one of the key activators as a first character sequence in a password input location of a user interface; and
receiving the security credential as a second character sequence in the password input location.

11. The method of claim 8, further comprising:
providing a user interface including a username input location and a password input location;
receiving a first user input including a username at the username input location and at least one of the key activators at the password input location; and
receiving a second user input including the username at the username input location and the security credential at the password input location.

12. The method of claim 8, further comprising:
providing a user interface, including a first input field and a second input field;
receiving the first key activator at the first input field and the second key activator at the second input field; and
receiving a username at the first input field and the security credential at the second input field.

13. The method of claim 8,
wherein the security credential is transmitted during the predefined time interval; and
wherein the indicator indicates that the security credential was authenticated.

14. The method of claim 8,
wherein the security credential is transmitted outside of the predefined time interval, wherein the security credential is a valid credential; and
wherein the indicator indicates that the security credential was not authenticated.

15. The method of claim 8, further comprising:
transmitting a plurality of credentials that includes the security credential, wherein a number of the plurality of credentials is more than a predefined number of credentials transmitted during the predefined time interval; and
reducing the predefined time interval based on the transmitting the number of the plurality of credentials.

16. A non-transitory computer readable medium having instructions stored thereon, that when executed by a processor, cause the processor to perform operations, the operations comprising:
transmitting to an authentication module, from a client device, a sequence of Unified Resource Identifiers (URIs) comprising a first Unified Resource Identifier (URI) and a second URI, wherein a first key activator is included in the first URI and a second key activator is included in the second URI, and wherein the first key activator and the second key activator are configured to activate the authentication module for authenticating a security credential;
transmitting, the security credential to the authentication module for authentication; and
receiving an indicator indicating whether the security credential was authenticated.

17. The non-transitory computer readable medium of claim 16, further comprising:
receiving the first and second key activators and the security credential at the same user input location of a user interface displayed on the client device.

18. The non-transitory computer readable medium of claim 16, further comprising:
providing a user interface, including a first input field and a second input field;
receiving the first key activator at the first input field and the second key activator at the second input field; and
receiving a username at the first input field and the security credential at the second input field.

19. The non-transitory computer readable medium of claim 16,
wherein the security credential is transmitted during a predefined time interval; and
wherein the indicator indicates that the security credential was authenticated.

20. The non-transitory computer readable medium of claim 16, further comprising:
transmitting a plurality of credentials that includes the security credential, wherein a number of the plurality of credentials is more than a predefined number of credentials transmitted during a predefined time interval; and
reducing the predefined time interval based on the transmitting the number of the plurality of credentials.

* * * * *